B. L. CLOVER.
STEAM TRAP.
APPLICATION FILED DEC. 7, 1912.
1,215,912.
Patented Feb. 13, 1917.
2 SHEETS—SHEET 2.
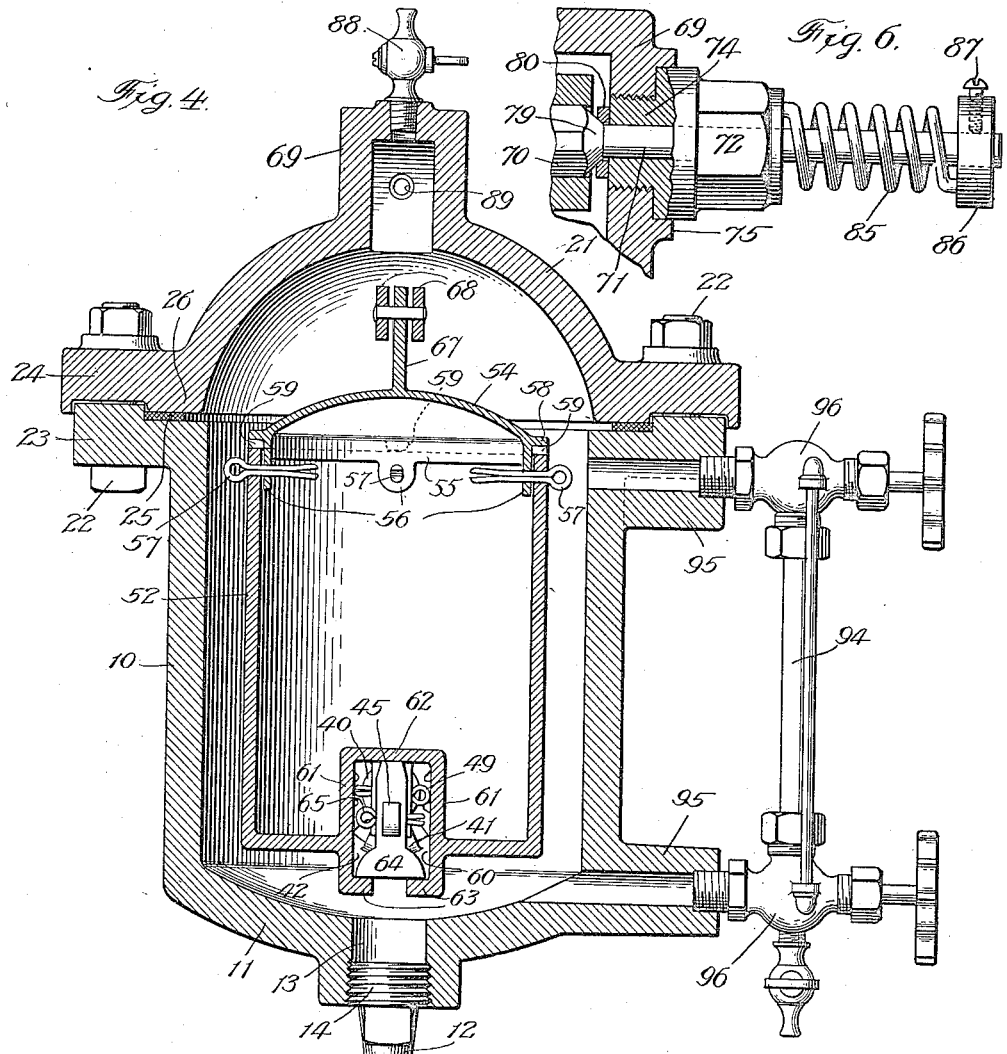
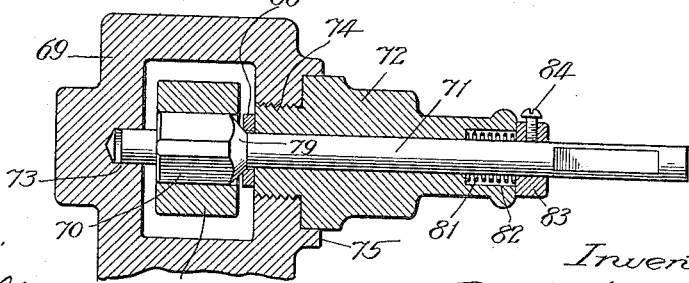

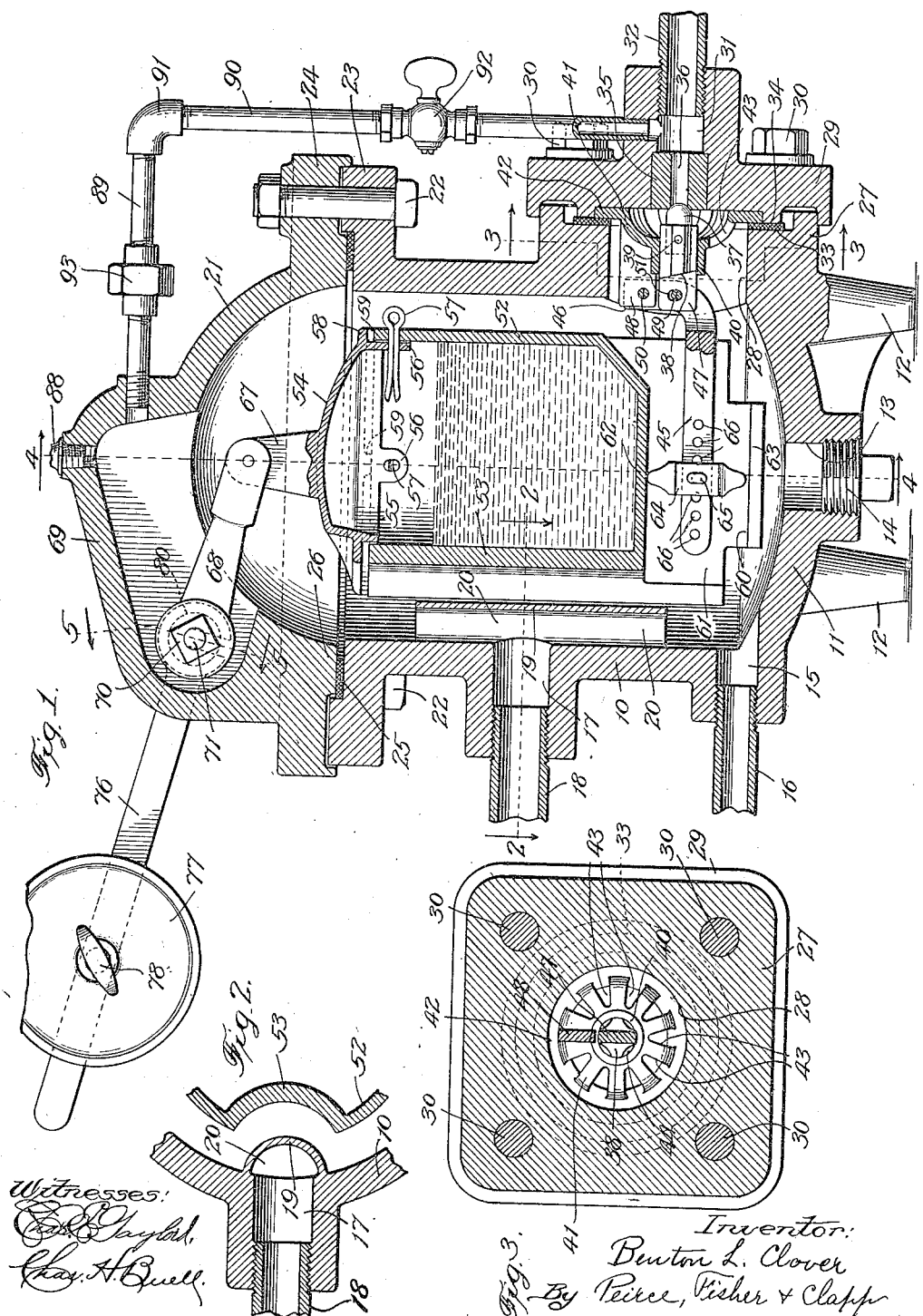

UNITED STATES PATENT OFFICE.

BENTON L. CLOVER, OF CHICAGO, ILLINOIS.

STEAM-TRAP.

1,215,912. Specification of Letters Patent. Patented Feb. 13, 1917.

Application filed December 7, 1912. Serial No. 735,576.

*To all whom it may concern:*

Be it known that I, BENTON L. CLOVER, a citizen of the United States, and a resident of Chicago, county of Cook, and State of Illinois, have invented certain new and useful Improvements in Steam-Traps, of which the following is a full, clear, and exact description.

The invention relates to steam traps for collecting and discharging the condensation from steam pipes and more particularly to that type of steam trap employing a displacement chamber or float in the trap for opening and closing the discharge valve. In traps of this sort, it is extremely difficult to obtain a satisfactory intermittent operation of the trap since the valve operating mechanism, if properly set to open the valve when the vessel is full, will act to close the valve before the contents of the vessel is properly discharged. The present invention seeks to provide a sluggish or slow operating float which will maintain the discharge valve open until the contents of the trap vessel are properly discharged and which float is hollow and adapted to hold water condensed from the steam, but which is provided with means for preventing the accumulation of sediment therein. The invention also seeks to provide an improved means for adjusting or regulating the operation of the valve operating float so that the trap may be readily and nicely adapted for steam systems of different pressures. The invention also seeks to otherwise improve the construction of the trap and consists in the features of construction hereinafter set forth, illustrated in the preferred form in the accompanying drawings and more particularly pointed out in the appended claims.

In the drawings, Figure 1 is a vertical section of the improved trap. Figs. 2 and 3 are detail sections on the lines 2—2 and 3—3, respectively, of Fig. 1. Fig. 4 is a vertical section on the line 4—4 of Fig. 1. Fig. 5 is a detail section on the line 5—5 of Fig. 1. Fig. 6 is a view illustrating a modification of the counterbalancing means for the displacement chamber or float.

The improved trap comprises a cylindrical vessel 10 of cast iron having a dished integral bottom 11 and supporting feet 12. The bottom is preferably provided at its center with a clean-out opening 13 which is normally closed by a plug 14. On one side near the bottom surface the trap vessel is provided with a port 15 adapted to be connected to a blow-off pipe 16. At one side intermediate the upper and lower ends the vessel is provided with an inlet port 17 which receives the condensation from the steam pipes through an inlet pipe 18. A baffle 19, arc-shaped in section, is arranged within the interior of the vessel 10 and extends over the inlet pipe 17. The baffle is preferably cast integral with the walls of the vessel 10 and forms a vertical passage 20 therein which is open at its upper and lower ends. This baffle prevents the fluctuation of the pressure in the steam system from interfering with the proper operation of the trap.

The upper end of the vessel is closed by a dome-shaped cover 21 which is held in position by a series of bolts 22 which pass through a flange 23 on the upper end of the vessel and through a flange 24 on the lower portion of the cover. The upper face of the flange 23 is recessed at a distance from its outer edge to form a seat for a gasket 25 and the flange 24 is provided with a coöperating annular shoulder 26 arranged to engage the gasket, and form a tight joint between the body of the vessel and its cover.

At its lower side portion opposite the inlet port 17, the vessel 10 is provided with a large rectangular boss 27 having a large circular opening 28 therein. A cap-piece 29 fits over the boss 27 and is held in place by bolts 30. The cap is provided with a bore or passage 31 that communicates with a discharge pipe 32. The face of the boss 27 is provided with a circular recess for a gasket 33 and the inner face of the cap-piece 29 is provided with an annular shoulder 34 which is arranged to engage the gasket and form a tight joint between the cap 29 and the body of the vessel 10.

The inner end of the bore or passage 31 is preferably slightly enlarged and is arranged to receive a removable piece 35 of hardened steel having a discharge port 36 extending therethrough and a seat at the inner end of the discharge port for an inwardly opening valve 37. The valve 37 is in the form of a plug removably mounted within a socket in a short valve stem 38, the valve being secured to the stem by a pin 39. The valve stem is guided within a hub 40 formed upon the central portion of an inwardly projecting spider 41. At its outer edge the spider 41 is provided with a circular flange 42 which is arranged within a recess formed in the face of the cap-piece 29 inside of the shoulder 34 thereof. This flange is larger than the opening 28 in the vessel, so that the spider which supports the valve is securely held in place between the inner face of the cap-piece 29 and the outer face of the boss 27 and preferably, as shown, the inner portion of the gasket 33 overlaps the inner face of the spider flange 42. The water of condensation collected in the trap vessel reaches the discharge port 36, through a series of perforations 43 formed in the body of the spider 41. Preferably, also, the valve stem 38 is cut away or grooved to form passages 44 (see Fig. 3) between it and the inner surface of the hub 41. This construction also prevents the valve stem from sticking.

The valve is provided with an operating or shifter arm 45. This arm is elbow shaped and is provided with an outer, upturned, forked end 46, the members of which overlap an inwardly projecting lug 47 on the end of the valve stem 38 and an inwardly projecting lug 48 on the spider 41. Cotter pins 49 and 50 pivotally connect the shifter arm to the lugs 47 and 48. The opening 51 in the lug 47 through which the cotter pin 49 extends, is elongated in vertical direction, as shown in Fig. 1, so that the valve stem and valve can be shifted in a straight line to and from the valve seat as the shifter arm is swung upon its pivot pin 50.

The movement of the shifter arm and the discharge valve are controlled by a displacement vessel or float 52. This float is of heavy construction, is formed of cast iron and is provided with a closed bottom. The portion 53 of the float, opposite the baffle 19, is preferably inwardly offset, as shown. The upper end of the float is closed by a loose fitting dome-shaped cover 54. This cover is provided with a depending flange 55 which fits loosely within the upper end of the float and which is provided with a series of perforated lugs 56. Cotter pins 57 extending through the upper edge portions of the float and the perforated lugs 56 secure the cover to the body of the float. Preferably, also, as shown, the cover 54 is provided with a horizontally projecting flange 58 which overlaps the upper edge of the body of the float, but which is spaced therefrom by a series of lugs 59. The cover effectually prevents the collection of sediment within the float which might overweight the float and interfere with its proper operation, but inasmuch as the cover is a loose fit, steam condenses within the displacement chamber or float, so that it is normally about three-quarters full of liquid, as indicated in Fig. 1.

At its lower end, the float is provided with a transverse passage, the walls of which are preferably cast integral with the walls of the float. As shown, this passage 60 has side walls 61, a top wall 62 and a bottom wall which is divided by a longitudinal slot into two flanges or ledges 63. The shifter arm 45 for the discharge valve extends through the passage 60 and suitable adjustable connecting means are provided between the walls of the passage and the shifter arm. In the preferred construction shown, a fulcrum block 64 is mounted upon the arm 45 and is provided with rounded upper and lower ends which are arranged to be engaged by the upper and lower walls, respectively, of the transverse passage 60 in the float to thereby open and close the discharge valve. The fulcrum block 64 is provided with a central opening through which the arm 45 extends and a cotter pin 65 extends through these parts to hold the fulcrum block in position. As shown, the arm 45 is provided with a longitudinal series of holes 66 to receive the cotter pin 65 so that the fulcrum block may be adjusted and secured in adjusted position upon the arm. In this way, the leverage exerted by the displacement chamber or float 52 upon the discharge valve can be nicely regulated in accordance with the pressure of the steam system with which the trap is used.

The displacement chamber or float is heavy or sluggish in action and means are provided for counterbalancing its weight. As shown, the float cover 54 is provided with an upwardly projecting lug 67 which is pivoted to the forked end of a rock arm 68. This rock arm is arranged to move up and down in a cavity formed within a raised portion 69 of the cover 21. The hub of the rock arm is provided with a square opening arranged to engage the inner squared portion 70 of a rock shaft 71. This rock shaft is journaled within a bushing 72 mounted in the side of the projecting portion 69 of the cover and preferably, the extreme inner end of the shaft is supported within a seat 73 formed in the side wall of the part 69. As shown, the bushing 72 is provided with a reduced, inner end portion 74 which is threaded into an opening formed in the part 69 and the latter is provided with a flange 75 which overlaps the bushing, as most clearly shown in Fig. 5. An arm 76 is mounted upon the flattened, outer end of the rock shaft 71 (see Fig. 1) and a weight 77 is adjustably secured to the arm 76 by a set screw 78 to thereby counterbalance the weight of the displacement chamber or float 52.

The use of a stuffing box about the rock shaft 71 is apt to interfere with the proper operation of the steam trap. To obviate the necessity of employing a stuffing box, the enlarged part 70 at the inner end of the rock shaft is provided with a conical valve-like shoulder 79 which is arranged to engage a valve seat about the rock shaft. This valve seat is preferably formed upon a washer 80 through which the shaft 71 extends and which abuts against the inner end face of the bushing 72. The abutting faces of the shoulder and bushing are machined, so that they snugly fit one upon the other. The opening in the washer is preferably slightly larger than the shaft 71. The construction is such that if the bearing of the shaft in the bushing 72 wears, the washer 80 can adjust itself upon the inner end face of the bushing, so that there will always be a tight joint between the valve-like shoulder 79 and the washer 80 to prevent leaking around the rock shaft.

Ordinarily, the pressure of steam within the trap will be sufficient to hold the valve-like shoulder 79 snugly in engagement with its seat on the washer 80, but to secure a snug engagement with low pressures, a spring may be employed, if desired. This spring 81 is arranged in a recess 82 in the outer reduced end of the bushing 72 and extends between the inner end of the recess and a collar 83 which is fixed to the shaft by a screw 84.

Instead of counterbalancing the weight of the displacement chamber or float 52 with a weighted lever, a heavy torsion spring may be employed. Such a spring 85 is shown in Fig. 6. The spring is coiled about the rock shaft 71, is connected at its inner end to the bushing 72 and at its outer end to a collar 86 which is adjustably fixed to the shaft by a set screw 87. By adjusting the collar, the tension of the spring 85 may be adjusted to properly counterbalance the weight of the float.

As shown, the extreme upper portion of the part 69 of the cover is preferably provided with a port controlled by a vent cock 88. Preferably, also, the upper portion of the cover is connected to the discharge passage 31 of the cap-piece 29 by a vent pipe comprising vertical and horizontal portions 89 and 90 connected by an elbow 91. A valve 92 is interposed in the vertical portion 90 of the vent pipe and the horizontal portion thereof is preferably formed of two sections connected by a union coupling 93.

In operation, as stated, steam is condensed within the displacement chamber or float 52 so that the latter contains considerable water and is heavy and sluggish in operation. The discharge valve 37 is held to its seat by the float and by the internal pressure within the closed trap vessel. The weight of the float and of the water contained therein is nearly counterbalanced by the adjustable weight 77 on the arm 76, or by the torsion spring 85 shown in Fig. 6, which are connected to the float through the medium of the rock shaft 71 and the rock arm 68. As the condensed water accumulates in the steam system, it gradually fills the vessel 10 until the float 52 is lifted to open the discharge valve. The pressure within the vessel then quickly forces the condensation out through the discharge port 36 and the rush of liquid through the lower portion of the trap operates to effectively carry away the greater amount of any collected sediment. The float is heavy and sluggish and its weight is nicely counterbalanced, so that it holds the valve open until the greater portion of the condensed water collected therein is discharged. The valve is then closed and the operation is repeated, so that an effective, intermittent action is maintained. In order that this action may be conveniently watched, the trap is preferably provided with a sight glass 94 (see Fig. 4) which is connected to ported bosses 95 at the upper and lower ends of the vessel 10 through the medium of the usual valves 96. The discharge of liquid from the trap acts in an effective manner to sweep away the greater portion of any sediment collected. From time to time the trap may be blown off through the pipe 16.

The improved trap can be readily adapted to properly operate with different steam pressures by adjusting the counterbalancing means for the displacement chamber or float 52 and by adjusting the fulcrum block 64 to properly regulate the leverage of the float upon the discharge valve. With high pressures, the leverage of the float upon the valve will need to be increased by shifting the fulcrum block 64 nearer the outer end of the arm 45. With lower pressures, the fulcrum block should be adjusted in the opposite direction. Furthermore, the valve 37 and valve seating member 35 can be readily removed from the stem 38 and the cap-piece 29 and replaced by a larger or smaller valve and valve seat, as may be required for lower or higher pressures. The improved trap is simple in construction, can be readily assembled and taken apart for repairs and the like and is not liable to get out of order. In assembling the parts the rock arm and float cover are secured within the cover 21 by means of the rock shaft 71. The float 62 is then secured to the float cover by the cotter pins 57 and the cover 21 is placed upon the vessel 10 and secured thereto by the bolts 22. The walls of the vessel 10 prevent the displacement of the cotter pins 57. The valve and valve operating shifter arm are mounted upon and are held in place by the cap-piece 29 and are readily accessible upon removing this part. The connection between the shifter arm and the operating float is formed by passing the arm and fulcrum block thereon into the passage 60 in the lower end of the float. The lower wall of this passage is slotted so that the arm 45 may pass between the ledges or shoulders 63 when the float is at the upper end of its movement. These parts may, of course, be readily disengaged from the float by removing the cap-piece 29.

It is obvious that numerous changes may be made without departure from the essentials of the invention as defined in the claims.

I claim as my invention:—

1. In a steam trap, the combination of a closed vessel having an opening in the lower portion of its side wall, a valve supporting member removably held in place at said opening, an inwardly opening valve and an inwardly extending valve-operating arm mounted on said supporting member, a float in said vessel, means mounted at the upper portion of said vessel and connected to said float for counter-balancing the same, and means adjustably connecting said arm and float in vertical direction only, said arm being removable in lateral direction with said valve supporting member, substantially as described.

2. In a steam trap, the combination of a closed vessel having a discharge port at its lower portion, a valve controlling said port, a shifter arm for said valve, a fulcrum block adjustably mounted on said arm, and a float in said vessel having abutments arranged to engage said fulcrum block in its different adjusted positions to open and close said valve, said abutments being spaced apart in vertical direction to permit the lateral insertion and removal of said arm and fulcrum block, substantially as described.

3. In a steam trap, the combination of a closed vessel having an opening in the lower portion of its side wall, a valve-supporting member removably held in place at said opening, an inwardly opening valve and an inwardly extending, horizontal shifter arm for said valve mounted upon said valve support, a counter-balance float suspended in said vessel and having a transverse passage at it lower portion through which said arm extends, and adjustable means interposed between said arm and the upper and lower walls of said passage for operatively connecting said arm and float in outward direction only, said arm being removable in lateral direction from said passage, substantially as described.

4. In a steam trap, the combination of a closed vessel having a discharge port at its lower portion, a valve controlling said port, a horizontally disposed shifter arm for said valve, a fulcrum block adjustably mounted on said arm, and a float suspended in said vessel and having a transverse passage at its lower portion through which said arm and fulcrum block are adapted to be inserted and removed, the upper and lower walls of said passage being arranged to engage said fulcrum block to shift said arm and open and close said valve, substantially as described.

5. In a steam trap, the combination of a closed vessel having an opening in its side wall adjacent its lower end, a valve-supporting member removably secured in place over said opening, a valve mounted on said supporting member and opening inwardly against the pressure in said vessel, a float in said vessel, means connected to the upper end of said float for sustaining the same in position in said vessel, adjustable devices connected to said suspending means for counter-balancing the weight of said float, a shifter arm for said valve mounted on said valve-supporting member and extending inwardly therefrom, and adjustable means for connecting said arm to said float in vertical direction only, substantially as described.

6. In a steam trap, the combination of a closed vessel, a valve-supporting member removably mounted on the lower portion of the side wall of said vessel, a valve mounted on said member and opening inwardly against the pressure in said vessel, an actuating arm for said valve mounted on said supporting member and extending inwardly therefrom, a rock shaft journaled in the upper portion of said vessel, a crank arm on said rock shaft within said vessel, a float suspended from said crank arm and connected to said valve actuating arm in vertical direction only, and means connected to the outer end of said rock shaft for counterbalancing the weight of said float, substantially as described.

7. In a steam trap, the combination of a vessel open at its upper end and having an opening in the lower portion of its side wall, a cover plate for closing the open upper end of said vessel, a valve supporting and guiding member removably fixed in position over said opening, a valve guided in said member and opening inwardly against the pressure in said vessel, an L-shaped lever arm pivoted on said guide and having a pin-and-slot connection with said valve, a fulcrum block adjustably mounted on said lever arm, a float adapted to be inserted in said vessel through its open upper end, and means mounted in the upper portion of said vessel and connected to the upper end of said float for suspending and counterbalancing the same, said float having abutments arranged to engage said fulcrum block to open and close said valve, said abutments being spaced apart to permit the lateral insertion and removal of said arm and said fulcrum block, substantially as described.

8. In a steam trap, the combination of a closed vessel having an opening in the lower portion of its side wall, a cap-piece secured to said vessel, extending over said opening and having a discharge port therein, a supporting guide member held in place between said cap-piece and the wall of said vessel, an inwardly opening valve supported by said guide and controlling said port, a horizontal arm provided with an upturned end pivoted to said guide and having a pin-and-slot connection with said valve, and a counterbalanced float suspended in said vessel and having abutments above and below said arm for shifting the same to open and close said valve, substantially as described.

9. In a steam trap, the combination of a closed vessel having a discharge port at its lower portion, a valve controlling said port, a hollow float adapted to contain condensation and operatively connected to said valve, a deflecting guard cover loosely fitting the upper end of said float, a rock shaft journaled in the upper portion of said vessel and extending into the chamber within the same, a rock arm on said shaft and within the chamber of said vessel, said float cover being connected to and suspended from said rock arm, means connecting said float to said cover to thereby suspend the same from said cover, and counter-balancing means connected to the outer end of said rock shaft, substantially as described.

10. In a steam trap, the combination of a vessel having a discharge port at its lower end, a valve controlling said port, a hollow float adapted to contain condensation operatively connected to said valve, a cover mounted on and closing the open upper end of said vessel, a rock shaft journaled in said cover and extending into the chamber within said vessel, counter-balancing means connected to the outer end of said shaft, a rock arm on said shaft and within the chamber of said vessel, a float cover plate pivotally connected to and suspended from said rock arm, said float being connected to and suspended from said cover plate, substantially as described.

11. In a steam trap, the combination of a vessel open at its top and having an opening in its side wall adjacent its bottom, a valve-supporting member secured in place at said opening, a valve and an inwardly extending valve-operating arm mounted on said supporting member, a cover plate for closing the upper end of said vessel, a float in said vessel, the walls of said float having abutments above and below said arm and coöperating therewith to open and close said valve, and means on said cover plate for suspending and counterbalancing said float, said valve and valve-operating arm being removable laterally from said vessel with said valve-supporting member, and said float being removable vertically from the vessel with said cover plate, substantially as described.

12. In a steam trap, the combination with an open top vessel having an inlet port in its side wall, a vertically disposed baffle in its interior extending over said inlet port and terminating above the bottom of said vessel, said vessel having an opening in the lower portion of its side wall opposite the lower end of said baffle, a valve-supporting member removably held in place over said opening, a valve and a valve-operating arm mounted on said supporting member, a hollow float in said vessel adapted to contain condensation, and having abutments above and below said arm and coöperating therewith to open and close said valve, a cover for closing the open upper end of said vessel, a rock shaft journaled in said cover and extending into the chamber within said vessel, an arm on the inner end of said shaft connected to said float, an adjustable counter-balancing means connected to the outer end of said shaft, substantially as described.

13. In a steam trap, the combination of a vessel open at its upper end and having an opening in its side wall adjacent its lower end, a cap plate extending over said opening and having a discharge port therein, a guide held in place by said cap plate, an inwardly opening valve mounted in said guide and arranged to control said discharge port, a valve-operating lever mounted on said guide and extending inwardly therefrom, a chambered cover plate closing the upper end of said vessel, a rock shaft journaled in said cover plate and extending into the chamber thereof, counter-balancing means connected to the outer end of said rock shaft, an arm on the inner end of said shaft and within the chamber of said cover, a hollow float, adapted to contain condensation, suspended from said arm, and means for connecting the lower portion of said float and said arm arranged to permit the lateral insertion and removal of said arm, substantially as described.

14. In a steam trap, the combination of a vessel open at its upper end and having an opening in its side wall adjacent its bottom, a supporting member secured in place at said opening, a valve and an inwardly extending valve operating arm mounted on said supporting member, a chambered cover plate for closing the open upper end of said vessel, a float in said vessel having abutments above and below said arm and coöperating therewith to open and close said valve, a rock shaft journaled in said cover and extending into the chamber thereof, counter-balancing means connected to the outer end of said shaft and a rock arm on said shaft within said cover connected to and suspending said float, said valve and valve operating arm being removable laterally from the vessel with said valve supporting member and said float being removable vertically from said vessel with said cover plate, substantially as described.

15. In a steam trap, the combination of a vessel having an opening in its lower portion, a valve and a valve seat removably held in place at said opening, a counter-balanced float suspended in said vessel, a valve actuating arm coöperating with said float and means for varying the leverage of said float upon said valve, said arm being movable through said opening into and out of coöperative relation with said float.

16. In a steam trap, the combination of a vessel open at its upper end and having an opening in the lower portion of its side wall, a cover plate for closing the open upper end of said vessel, an inwardly opening valve and valve seat removably mounted in position at said opening, a counter-balanced float suspended from said cover plate, an arm interposed between said valve and the lower end of said float, said arm being laterally movable through said opening and into and out of coöperative relation with said float and means associated with said arm for varying the leverage of said float upon said valve.

17. In a steam trap, the combination of a vessel open at its top and having an opening in its side wall adjacent its bottom, a valve and a valve seat removably secured in place at said opening, an inwardly extending valve operating arm, a cover plate for closing the upper end of said vessel, a counterbalanced float suspended in said vessel the walls of said float having abutments above and below said arm and coöperating therewith to open and close said valve, said valve and said valve operating arm being removable laterally from said vessel through said opening and said float being removable vertically from said vessel through its open upper end.

BENTON L. CLOVER.

Witnesses:
HARRY L. CLAPP,
KATHARINE GERLACH.